(12) United States Patent
Ozaki

(10) Patent No.: US 6,393,153 B2
(45) Date of Patent: *May 21, 2002

(54) COMPRESSED MOVING PICTURE SIGNAL DECODING APPARATUS

(75) Inventor: Nozomu Ozaki, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/144,551

(22) Filed: Sep. 1, 1998

(30) Foreign Application Priority Data

Sep. 2, 1997 (JP) .............................. 9-237192

(51) Int. Cl.⁷ ................................................ G06K 9/36
(52) U.S. Cl. ....................................... 382/233; 382/236
(58) Field of Search ................................. 382/232, 233, 382/234, 235, 236, 237, 238, 239, 240, 241, 242, 243, 244, 245, 246; 348/390, 403, 411, 412, 413, 414, 415, 416, 565, 400–410; 375/240.26

(56) References Cited

U.S. PATENT DOCUMENTS

| | | | | |
|---|---|---|---|---|
| 5,428,393 A | * | 6/1995 | Enokida | 348/390 |
| 5,440,572 A | * | 8/1995 | Kitaori | 371/43 |
| 5,598,483 A | * | 1/1997 | Purcell et al. | 382/232 |
| 5,717,462 A | * | 2/1998 | Hayashi | 348/416 |
| 5,796,434 A | * | 8/1998 | Lempel | 348/403 |
| 6,031,575 A | * | 2/2000 | Suzuki et al. | 348/411 |
| 6,141,059 A | * | 10/2000 | Boyce et al. | 348/565 |

* cited by examiner

*Primary Examiner*—Phuoc Tran
*Assistant Examiner*—Amir Alavi
(74) *Attorney, Agent, or Firm*—Frommer Lawrence & Haug LLP; William S. Frommer; Gordon Kessler

(57) ABSTRACT

A decoding apparatus without increase of the necessary memory capacity, necessary chip area for integration of the memory and manufacturing costs, and with a reduction of the bus band width. It includes block compressors 35 and 59 which compress, block by block, an MPEG compressed moving picture signal once decoded to block level, a block address table 38 for holding address information of each block of the data compressed by the block compressors and written into a memory 37, and block expanders 46, 48 and 50 for reading the compressed data from the memory 37 and expand it block by block. At the times of actual presentation and motion compensation, a necessary compressed data is read from the memory 37, expanded and used for the actual presentation and motion compensation.

6 Claims, 12 Drawing Sheets

COMPRESSED MOVING PICTURE SIGNAL DECODING APPARATUS

BACKGROUND OF THE INVENTION

1. Field of the Invention

The present invention relates to an apparatus for decoding, through expansion, a moving picture signal compressed through two-dimensional picture compression, in particular, by a data compression technology using an interframe prediction as in the so-called MPEG system.

2. Description of Related Art

The data compression conforming to the so-called MPEG/Video (will be referred to as "MPEG" hereinafter) being the international standard for the moving picture compression, involves three types of frames (pictures) which will be described below. One of them is an I-picture (intra-code picture). This frame is not interframe predicted but compressed within itself. Therefore, the I-picture can be decoded requiring no data of any other frame. Other two frames are P-picture and B-picture. The P-picture is a predictive-coded picture, and B-picture is a bidirectionally predictive-coded picture. The P-picture is decoded through forward prediction from an I- or P-picture existing before the P-picture or frame in consideration. The B-picture is decoded through backward prediction from a frame existing after the frame in consideration in addition to forward prediction from an I- or P-picture existing before the frame in consideration. That is, the B-picture can be decoded through any of the forward, backward and bidirectional predictions. The MPEG referred to herein stands for the Moving Picture-coding Experts Group of the ISO/IEC JTC/SC29 (International Organization for Standardization/International Electrotechnical Commission, Joint Technical Committee 1/Sub Committee 29). The MPEG-1 (MPEG phase 1) standard includes ISO 11172, and the MPEG-2 standard includes ISO 13818. In these international standards, ISO 11172-1 and ISO 13818-1 are included in the item "system multiplexing", ISO 11172-2 and ISO 13818-2 are included in the item "video coding", and ISO 11172-3 and ISO 13818-3 are included in the item "audio coding".

FIG. 1 shows an example of the dependency of the above three types of frames I, P and B upon each other.

In FIG. 1, frames (pictures) are indicated with references I1, B2, B3 and P4, respectively, numbered from the left to right. As mentioned above, "I" means an intra-coded picture, namely, I-picture, "P" indicates a predictive-coded picture, namely, P-picture, and "B" indicates a bidirectionally predictive-coded picture, namely, B-picture. The arrows indicate directions of prediction, respectively. I1 is an I-picture numbered one, and decoded within itself. P4 is a P-picture numbered four. For decoding this frame, it is necessary to use a motion vector for reading the result of I1 frame decoding for calculation. B2 is a B-picture numbered 2. It is decoded through bidirectional prediction. For image restoration, an interframe prediction (that is, motion compensation) is done based on the results of I1 frame decoding and P4 frame decoding.

FIG. 2 shows, along the time base, necessary data for decoding frames of the above types.

In FIG. 2, data of the frame I1 is required for decoding itself as well as for motion compensation (MC) for each of the frames B2, B3 and P4. For decoding B-pictures including the frames B2, B3, etc., data of the frame P4 is required in addition to the data of the B-pictures themselves. The frame P4 being a P-picture is necessary for decoding the frames B2, B3, P4, B5 and B6 as shown in FIG. 2. The I-picture and P-picture required for decoding the B-pictures should have been decoded before the B-pictures are decoded, and should be held all the way through the decoding of the B-pictures. As seen from FIG. 2, data for up to three frames including the B-picture have to be held at a time. The buffer memories for holding these frames should have a large storage area. Therefore, they are used as external memories incidentally to the decoder.

FIG. 3 shows an example of the time of decoding in the actual MPEG decoder.

In FIG. 3, a time of decoding is indicated with a reference T1 while a time of presentation is indicated with a reference T2. In this example, a time gap between the decoding and presentation equivalent to 1.5 frames for I-picture (as indicated with T3 in FIG. 3), and 0.5 frame for B-picture (as indicated with T4). As seen also from FIG. 2, the result of I1 decoding in FIG. 3 is not only required for decoding the I1 frame, but for decoding the frames P4, B2 and B3, and so should be held for the time of their decoding. The P4 frame is necessary for presentation of the frame P4 itself and decoding of frames B2, B3, P7, B5, etc., and so held for the time of their decoding. The B-pictures are held either by buffering one frame or by holding only a part thereof, any of which will require a large memory area.

FIG. 4 shows an example of the conventional MPEG decoder configuration.

In FIG. 4, an MPEG bit stream is supplied to an MPEG decoder 7 at a terminal 6 thereof. Then, it is first decomposed by a demultiplexer 8 into audio and video bit streams. The bit streams are passed over a signal line 9, bus 10 and signal line 11, and written once into an area 14 of an external memory 13 via a memory interface circuit 12. There is shown a signal line 15 which represents a data bus, address signal line, etc. laid between the decoder 7 and external memory 13. Note that a block for processing audio signals is not shown in FIG. 1.

The video bit stream read from the area 14 of the external memory 13 is passed through the memory interface circuit 12, signal line 11, bus 10 and a signal line 16 to a video decoder 17.

The video decoder 17 comprises mainly a header/VLD circuit 18 for analysis of header and variable-length code, inverse quantizer (IQ; also dequantizer) 19, inverse discrete cosine transformer (IDCT) 20, motion compensator (MC) 21, etc.

The motion compensator 21 is supplied via a signal line 22 with a reference image read using the motion vector and reconstructs or restores it. The reconstructed or output image from the motion compensator 21 is passed through a signal line 23, bus 10, signal line 11 and memory interface circuit 12, and written into an area in the external memory 13. For example, a decoded I-picture, P-picture and B-picture are written into designated areas 24, 25 and 26, respectively, in the external memory 13. Each of these areas should have a size for one frame. The external memory 13 should have a rather large size. Note that the area 24 for the I-picture is also available for the P-picture.

The data of the I-picture in the external memory 13 is read at the time of presentation in FIG. 3, passed to an image display circuit 28 over a signal line 27, and delivered as an image data at a terminal 29. Also, the data of the I-picture in the external memory 13 is also read for decoding the B- or P-picture at the time shown in FIG. 3. The data of the P-picture is similarly read for presentation and also for decoding of the B-picture. In FIG. 4, the B-picture is shown written in one-frame area in this example. It is read from this area at the time of presentation shown in FIG. 3.

The aforementioned MPEG system combines together a variety of data compressing techniques to implement a high quality and compressibility of the video compression. The interframe prediction is one of the most important techniques. In the interframe prediction system, a motion vector is used to extract a block most approximate to a block being currently decoded from a frame existing before or after the frame in consideration, calculate a difference between the blocks and compress the result of the calculation. To decode a bit stream compressed through the interframe prediction, however, a frame data having previously been decoded should be held, which will require an increased memory capacity.

More particularly, the above-mentioned example of the conventional MPEG decoder needs to store decoded image data for at least 3 frames. This image data storage requires an external memory 13 having a large area. For a main level (ML) decoder according to MPEG, for example, required is an external memory 13 having a capacity of about 16 Mbits, and thus a large chip area is required for integration of the memory into the chip. These requirements will lead to a considerably large increase of manufacturing costs. Furthermore, for a high-level (HL) decoder conforming to MPEG, the frame size is 4 to 6 times larger and the necessary memory size is very large. For implementing the HL decoder with an external memory 13, the band width of a bus between the decoder 7 and external memory 13 is a problem. For integration of the memory into a chip, the chip area should be large. Therefore, such a decoder is difficult to implement with the prior art.

SUMMARY OF THE INVENTION

Accordingly, the present invention has an object to overcome the above-mentioned drawbacks of the prior art by providing a compressed moving picture signal decoding apparatus adapted to effectively function with a reduced bus band width as well as with no increase in memory capacity, chip area for integration of the memory into the chip and manufacturing costs.

The above object can be accomplished by providing a compressed moving picture signal decoding apparatus in which according to the present invention, a moving picture signal compressed through interframe prediction, a data resulted from decoding a compressed moving picture signal to block level is compressed on the unit of blocks, an address information of the data compressed and written into a memory is held block by block, the compressed data in the memory is read and expanded block by block, a necessary compressed data is read from the memory and expanded at the times of actual presentation and motion compensation, and used the data for the actual presentation and motion compensation.

More particularly, according to the present invention, a decoded data to be used later is compressed again by any other method and expanded when necessary to reduce the necessary memory capacity. In other words, frame data to be stored into the memory is compressed once, and read later when necessary for use in presentation or motion compensation. Hence, the memory size for holding the frame data is considerably reduced, the memory can be integrated into a chip, and also it is possible to accommodate a large number of pixels in the frame data without the necessity of increasing the memory size.

BRIEF DESCRIPTION OF THE DRAWINGS

These objects and other objects, features and advantages of the present intention will become more apparent from the following detailed description of the present invention when taken in conjunction with the accompanying drawings, of which.

DETAILED DESCRIPTION OF THE PREFERRED EMBODIMENTS

Before proceeding to the description of the embodiments of the present invention, the basic configuration and principle of operation of the present invention will be described herebelow.

The decoding apparatus according to the present invention is a system adapted to decode a moving picture signal compressed through interframe prediction as in MPEG, the international standard for moving picture compression. The decoding apparatus of the present invention enables to hold the decoded frame data in a memory of a reduced size.

According to the present invention, data once decoded based on the data compression algorithm of MPEG or the like are compressed based on any other algorithm and stored into a memory at the time of a decoding conforming to MPEG. Later, the stored data compressed based on the other algorithm are read and expanded for use in motion compensation or presentation as necessary. Namely, according to the present invention, the data decoded based on the MPEG algorithm are not held as they are in the memory but subjected to an appropriate compression for a subsequent processing and held, thereby reducing the data amount to be held in the memory and hence the memory size. The memory for holding the data compressed based on the other algorithm may be either an external memory or a memory in a chip.

More particularly, in the MPEG data compression, data in frames are dependent upon each other because of the interframe prediction. Also, in I-frame, data are somehow independent of each other at the slice level. At the macroblock or block level lower than the slice level, however, data are dependent upon each other, not independent of each other. For processing the macroblock/block in a slice by interblock differentiation of DC components, for example, the data should be processed from the slice top. Therefore, the MPEG algorithm cannot be a local compression algorithm.

For effecting the MPEG decoding, data stored as frame data is read for presentation and motion compensation. For the presentation, the data should be subjected to a raster scan, namely, it be read line by line horizontally. For the motion compensation, the data should be read at random block by block according to a motion vector.

In reading, for the motion compensation, a compressed data held in an external memory, any non-local dependency upon each other of the data in the external memory will necessitate reading much data and a long step of decoding for expansion of a necessary data. Therefore, the compression should preferably be local from the standpoints of the operating speed and data amount to be read.

Figure 1:
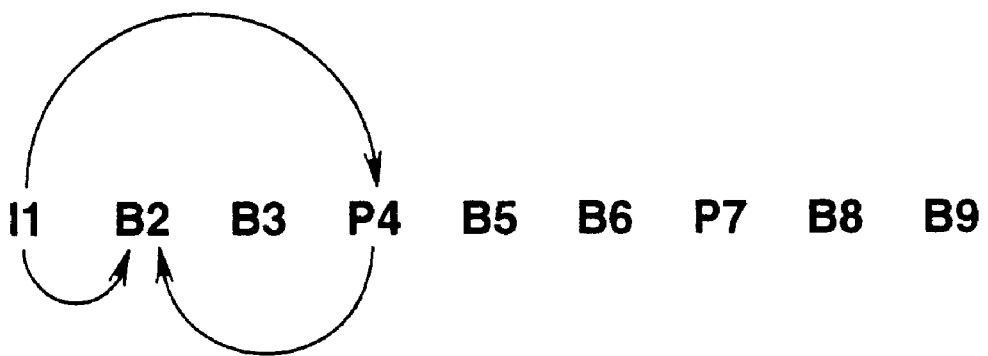
FIG. 1 is an explanatory drawing of the dependency among picture types in the MPEG system.
Figure 2:
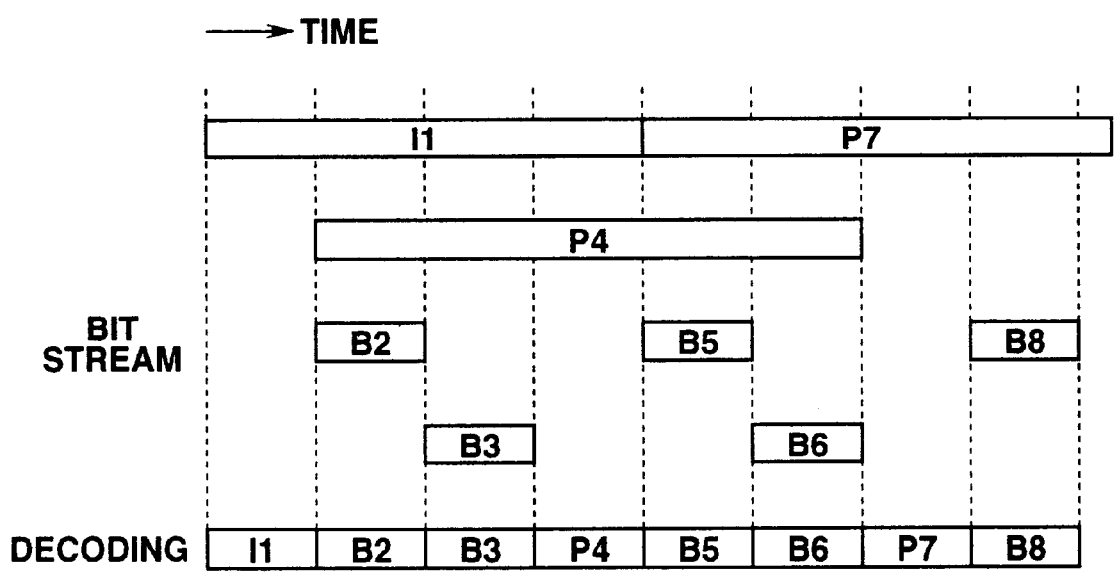
FIG. 2 is also an explanatory drawing of the data in a necessary bit stream for decoding of each frame.
Figure 3:
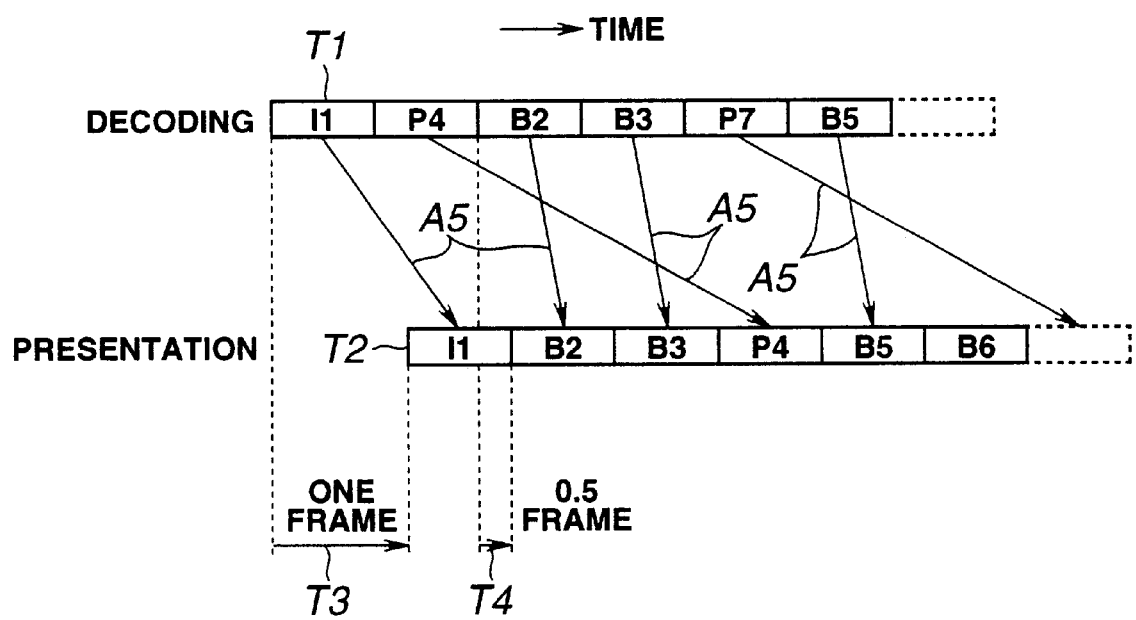
FIG. 3 is an explanatory drawing of the decoding timing and presenting timing in the conventional decoder.
Figure 4:
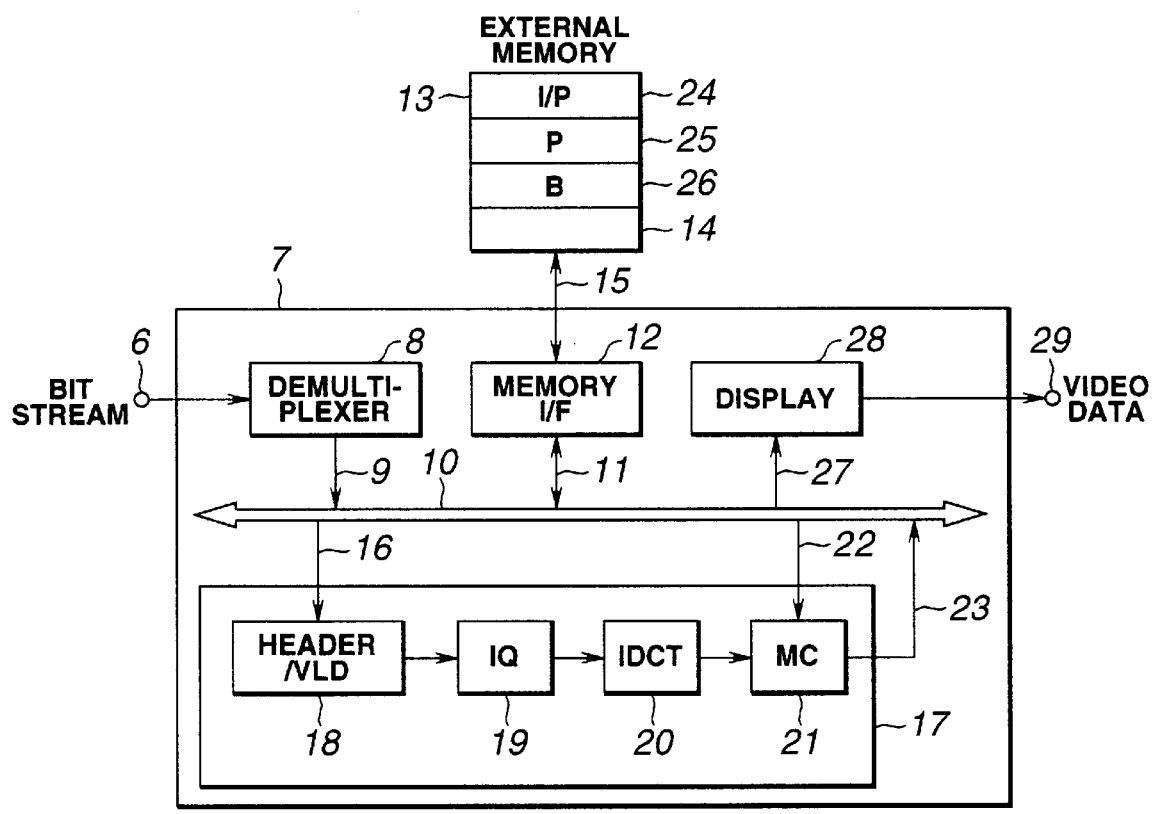
FIG. 4 is a block circuit diagram of an example of the configuration of the conventional MPEG decoder.
Figure 5:
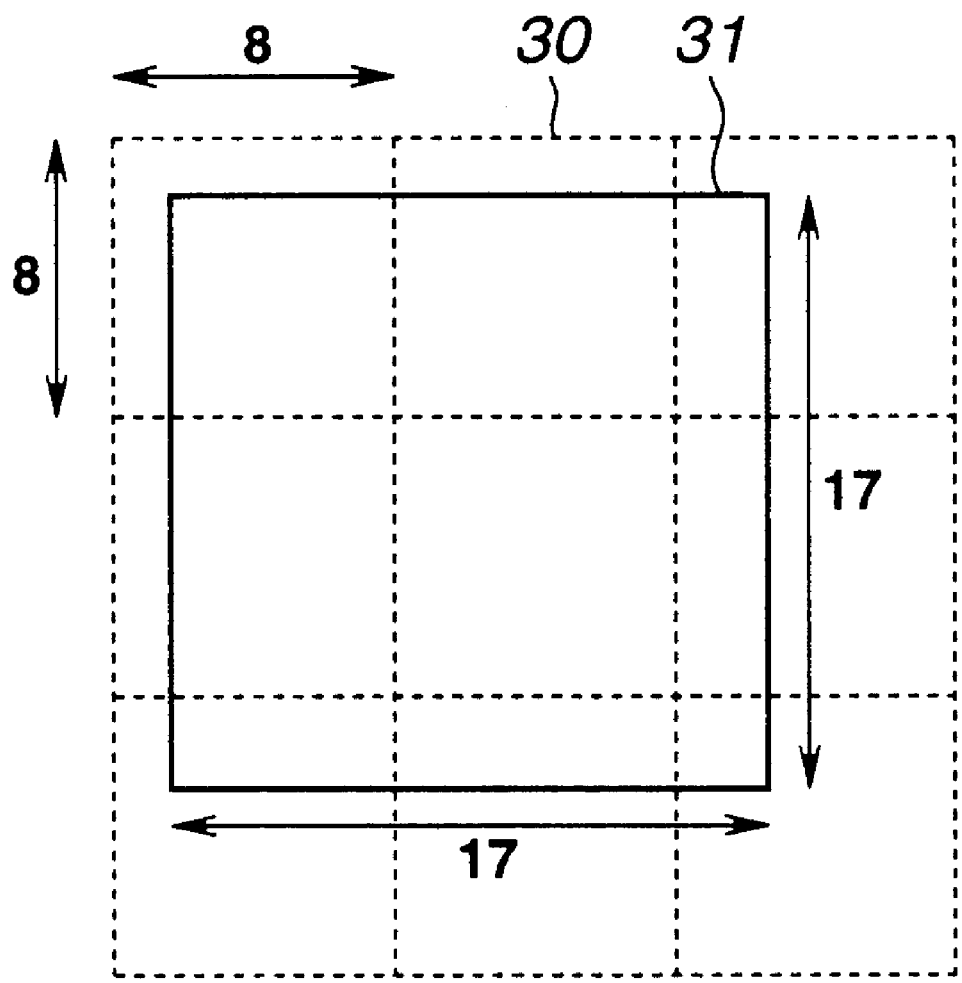
FIG. 5 is an explanatory drawing of necessary block data for motion compensation.

FIG. 5 schematically illustrates a block data necessary for motion compensation (MC). A basic MPEG block of 8×8 pixels is indicated with a reference 30, and a to-be-read area having a block of 17×17 pixels necessary for motion compensation is indicated with a reference 31. Since the to-be-read area of the block 31 for motion compensation varies freely with a value the motion vector takes, it is necessary to start reading the data at a position independent of the block 30 of 8×8 pixels. Also, since a data composed of half pixels is required, it is necessary to read a block one pixel larger horizontally and vertically than the macroblock size of 16×16 pixels. If a non-local compression is effected in acquiring such a data, it is necessary to secure and decode a data in a large area, and extract a necessary data, which results in only a low efficiency of decoding.

The present invention is based on the closed compression in each block of 8×8 pixels. However, the present invention is not limited to a compression of blocks each of 8×8 pixels but it is usable with a local algorithm, if available. There is a conflict between the locality and efficiency of calculation from the standpoint of the data compression, whichever is selected taking the system efficiency in consideration.

The required compression algorithm for use in the present invention will be generally described below:

(1) Locality

Intraframe processing.

Algorithm for closed compression within each block (2) Compressibility

A low compressibility of 2 to 6 times (3) Less processing

Less calculation for data compression and expansion to make it unnecessary to use a minimum necessary number of compressors and expanders (4) Reversibility Not always necessary. The necessity of the reversibility depends upon a required image quality level of the system.

Selection of a compression algorithm depends upon a required system level and method of implementing the level. A combination of discrete cosine transform and variable-length code, or a Hadamard transform simpler than them, etc. can be used. A variety of compression algorithms has even been proposed and practiced. One or more than one of them is selected to have an appropriate combination of algorithms.

Next, the embodiments of the present invention will be described in further detail.

MPEG is referred to herein for the convenience of the description of the present invention, but the present invention is not limited to MPEG. The present invention is applicable to any other compressing method based on a similar concept as MPEG. That is, the present invention can be applied to a variety of compressing methods in which a data once decoded is reused later. For the simplicity of explanation, the present invention will be described mainly concerning a progressive compression in which data is presented and processed on the unit of frames while it is described briefly concerning the interlaced presentation and processing. It should be noted that for the interlaced presentation and processing, data in a field should only be stored and processed. Furthermore, to correct a time gap between times of presentation of different fields in a same frame, data should be held only in a compressed form or field data be processed for presentation.

Figure 6:
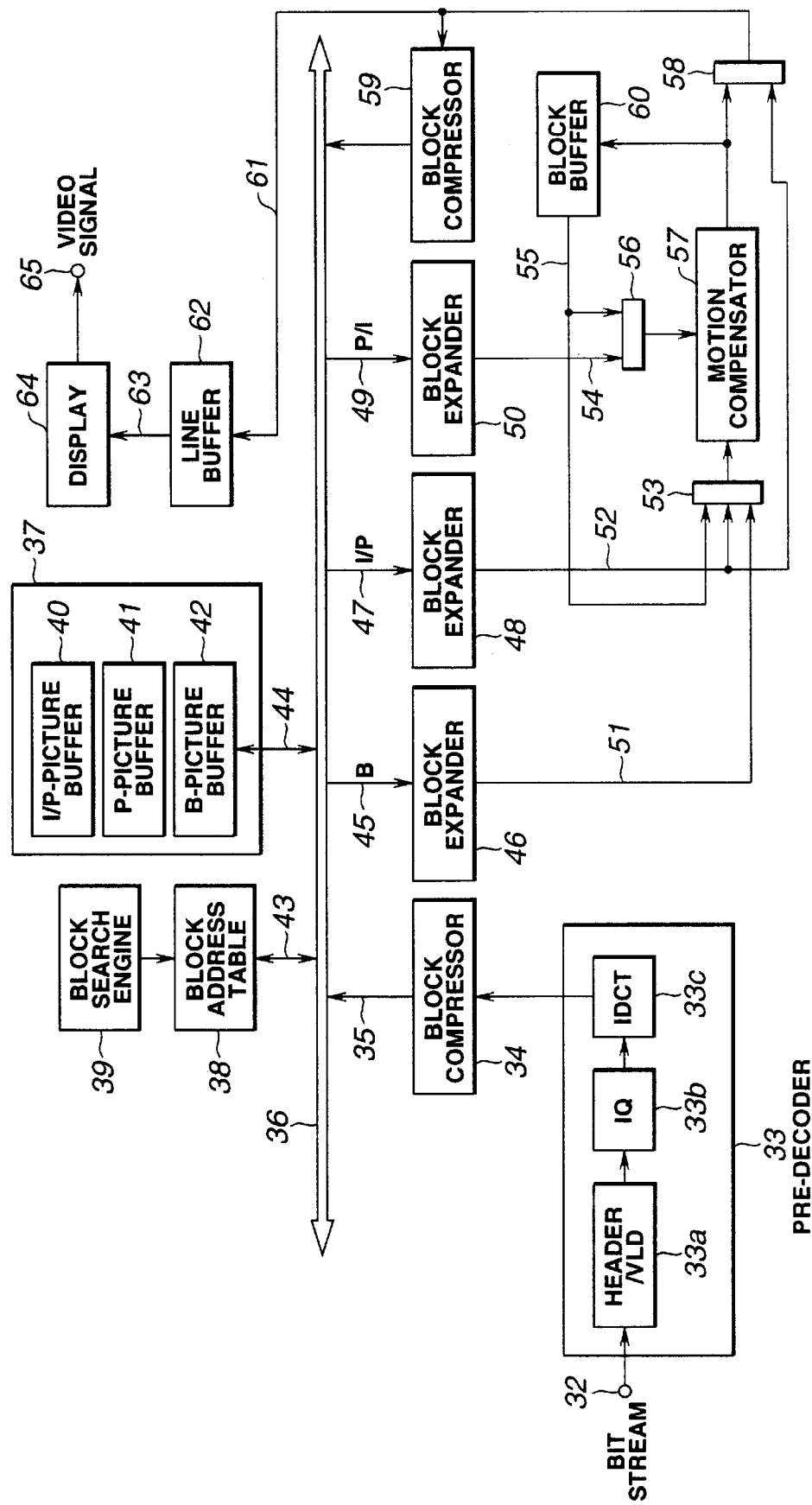
FIG. 6 is a block circuit diagram of a first embodiment of the decoding apparatus according to the present invention, showing the general configuration thereof.

FIG. 6 schematically shows the configuration of the decoding apparatus according to the first embodiment of the present invention.

As seen from FIG. 6, the decoding apparatus is supplied at a terminal 32 thereof with a bit stream covered by the MPEG/Video system. The bit stream is decoded first by a pre-decoder 33 according to the MPEG algorithm. How much the bit stream is decoded depends upon a target system level or a subsequent compression algorithm to be used, but the bit stream will be decoded to a level at which a closed compression in each block of 8×8 pixels is possible. In the example shown in FIG. 6, P- and B-pictures are decoded to a level before a motion compensation which will be done at a subsequent stage. Namely, the pre-decoder 33 comprises a header/VLD circuit 33a which analyses a header and decodes a variable-length code, an inverse quantizer (IQ) 33b and an inverse discrete cosine transformer (IDCT) 33c, and decodes the bit stream to a level before a motion compensation.

The result of the decoding by the pre-decoder 33 is compressed by a block compressor 34 which uses a different algorithm from the MPEG algorithm to compress data block by block, and written into a memory 37 via a signal line 35, bus 36 and a signal line 44. Information including motion vectors in the P- and B-pictures are inserted as parameters into the compressed bit stream. It should be noted that when the variable-length code is used for compression at this stage in this embodiment, since no boundary is fixed between blocks, a top address, length, etc. of a data in the block are recorded into a block address table 38 via a signal line 43.

To locate a data at a necessary block address after storage of the bit stream into the memory 37, a block search engine 39 is used to search the block address table 38 for acquiring the top address of the block. Then the data is read from the memory 37.

In the first embodiment, the memory 37 has provided therein an I-/P-picture buffer 40, P-picture buffer 41, and a B-picture buffer 42. For data read and write, the buffers are connected to the bus 36 by means of the signal line 44.

As aforementioned, data of I-, P- and B-pictures compressed block by block by the block compressor 34 are written into their respective areas in the memory 37.

For presentation of the I-picture, the compressed data of the I-picture is read from the memory 37, passed through the signal line 44, bus 36 and signal line 47 to the block expander 48 in which the data is expanded correspondingly to the compression algorithm used in the block compressor 34. The data of the I-picture expanded by the block expander 48 is passed through a signal line 52 to a selector 58 in which it is selected, and the selected data is further passed through a signal line 61 to a line buffer 62. In the first embodiment of the present invention, a block of 8×8 pixels is taken as a basic unit for compression, so that the data of 8×8 pixels of the I-picture expanded by the block expander 48 is stored in the line buffer 62. The stored pixel data is read in the order of raster scanning, and passed through a signal line 63 to a display circuit 64. The display circuit 64 generates from the supplied data a video signal for presentation which will be delivered at a terminal 65 of the display circuit 64.

On the other hand, for decoding a P-picture, a compressed data of the P-picture is read from the P-picture buffer 41 or I-/P-picture buffer 40 in the memory 37, and first passed to the block expander 48 in which it is subjected to a block expansion. A motion vector is also restored, and a compressed data of an I-picture (or P-picture) necessary as a reference frame for use in decoding the P-picture is read from the memory 37. Namely, a necessary block number in the reference frame is selected from the restored motion vector to acquire, by means of the block search engine 39 from the block address table 38, an address of a corresponding block in the memory 37. Owing to the address thus acquired, the compressed data of the necessary block is read from the memory 37 and passed through a signal line 49 in which the block is restored. The data thus restored by the block expander 50 is passed to a signal line 54, and thereafter only a data required for motion compensation is selected by a selector 56 and passed to a motion compensator 57. In the motion compensator 57, the data is interpolated on the unit of half pixels and added to a data having been expanded by the block expander 48 and passed through the signal line 52, for a motion compensation which is the last stage of a decoding. The result is passed to the line buffer 62 through the selector 58 and signal line 61, and further to the display circuit 64 in which it is made into a video signal for presentation. At this stage, the data of the P-picture is compressed again block by block by the block compressor 59 according to a different algorithm from the MPEG algorithm, and then stored into the memory 37. The P-picture compressed again after motion-compensated is read and expanded for decoding a subsequent frame, and used as a reference frame for forward prediction.

For decoding a B-picture, a bidirectional frame prediction is done as the case may be. Therefore, the decoding of the B-picture is more complicated than the P-picture decoding, and needs one more motion compensation (namely, two times of motion compensation in total). A compressed data read from the B-picture buffer 42 in the memory 37 is passed through the signal line 44, bus 36 and signal line 45 to the block expander 46 in which it is expanded block by block. Also in this case, a motion vector is extracted and a forward prediction is first done taking an I-picture (or P-picture as the case may; however, the P-picture, if applied, should have been motion-compensated block by block) as a reference frame. In addition, an address of the reference frame block designated by the motion vector is acquired by the block search engine 39 and block address table 38 as in the aforementioned decoding of P-picture, and used to read a necessary block data. The block data is expanded by the block expander 50. Thereafter, a necessary data is selected from the expanded block data and motion-compensated (first motion compensation) by the motion compensator 57 as in the P-picture decoding to provide a data which will be stored into a block buffer 60. Also, the data having subjected to the first motion compensation is compressed again by the block compressor 59 and stored into the memory 37, and used as a reference frame for decoding a subsequent frame. For a backward prediction, a block data is read from the block buffer 60 and passed to the motion compensator 57 through the signal line 55 and selector 53 which is also supplied with a necessary compressed data read from the memory 37 through a similar processing with a backward predictive motion vector to that with the forward predictive motion vector, and a block data expanded by the block expander 50. The motion compensator 57 operates for a motion compensation between the block data read from the block buffer 60 and block expander 50, respectively. The result of the motion compensation is sent to the stage located downstream of the line buffer 62 to generate a similar video signal for presentation to the aforementioned video signal.

When the reference frame for a B-picture is a P-picture, a one more step of calculation (second motion compensation) is required. Namely, in this embodiment, since no motion compensation is done after a pre-decoding as mentioned above, the P-picture is not any complete picture data and so should be motion-compensated before used as the reference frame. The required motion compensation is the same as for the P-picture, and the block data of the P-picture after motion-compensated is used for motion compensation of the B-picture, That is to say, since the motion-compensated picture data of the P-picture already presented has been compressed block by block by the block compressor 59 as mentioned above and stored in the memory 37, the compressed data of this P-picture is read and expanded for use as a reference frame for the forward prediction.

The first embodiment of the present invention has not been described concerning photochromatic component, field prediction, dual prime, etc. However, the aforementioned system and processing can easily accommodate them. If there is a presenting time gap between different fields in a same frame as in the interlaced presentation and processing in the first embodiment, a block decoded on the unit of macroblocks is compressed on the unit of fields. For presentation, these two fields are read separately, and motion-compensated on the unit of fields. As shown in FIG. 6, the block compressor and block expander are provided each in plurality in the decoding apparatus according to the present invention, but they may be shared for reduction of the necessary quantity.

Figure 7:
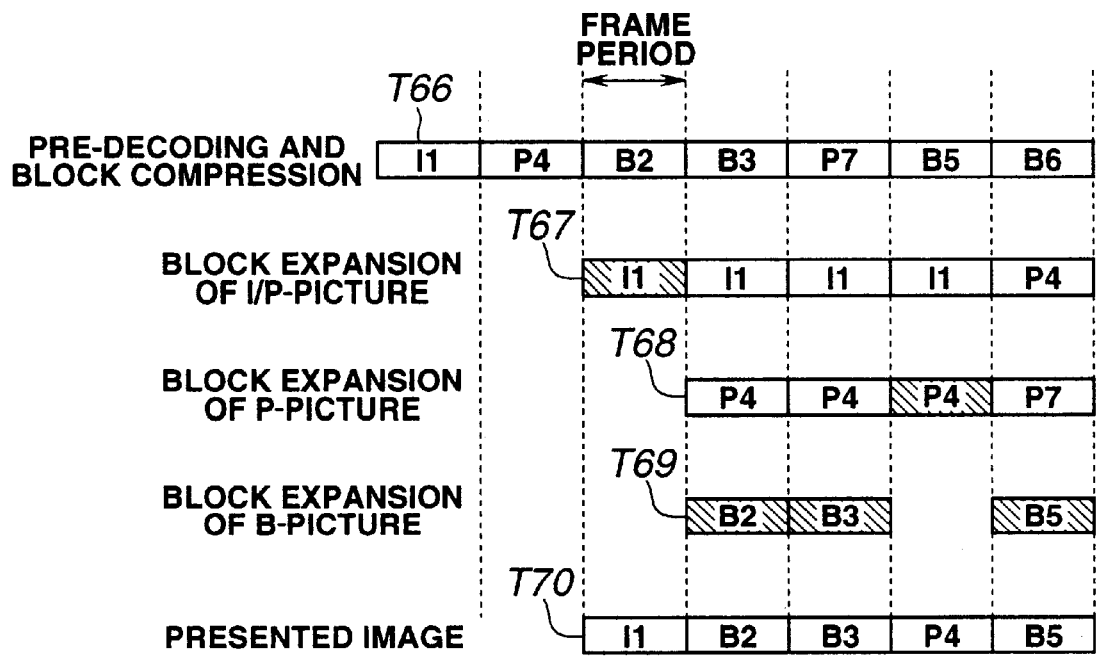
FIG. 7 shows the timed operations of the first embodiment.

FIG. 7 shows times of processing in the first embodiment shown in FIG. 6. In FIG. 7, times of pre-decoding and compression are indicated with a reference T66, time of I/P-picture expansion is with a reference T67, time of P-picture block expansion is with a reference T68, and time of B-picture block expansion is with a reference T69. Time of presentation is indicated with a reference T70. In FIG. 7, reference I1, P4, etc. indicate frames to be processed. An I-picture is pre-decoded and block-compressed two frames before presented. At the time of presenting the I-picture, only the data of the I-picture is block-expanded and presented. At the time of presenting a B-picture following the I-picture, the B-picture is block-expanded and I-/P-picture as a reference frame for motion compensation is block-expanded and motion-compensated, and presented. At the time of presenting the P-picture, the P-picture is block-expanded and I-picture (or P-picture) as a reference frame for motion compensation is block-expanded. Simultaneously with the presentation of the P-picture, the motion-compensated P-picture is also block-compressed again (not shown).

Figure 8B:
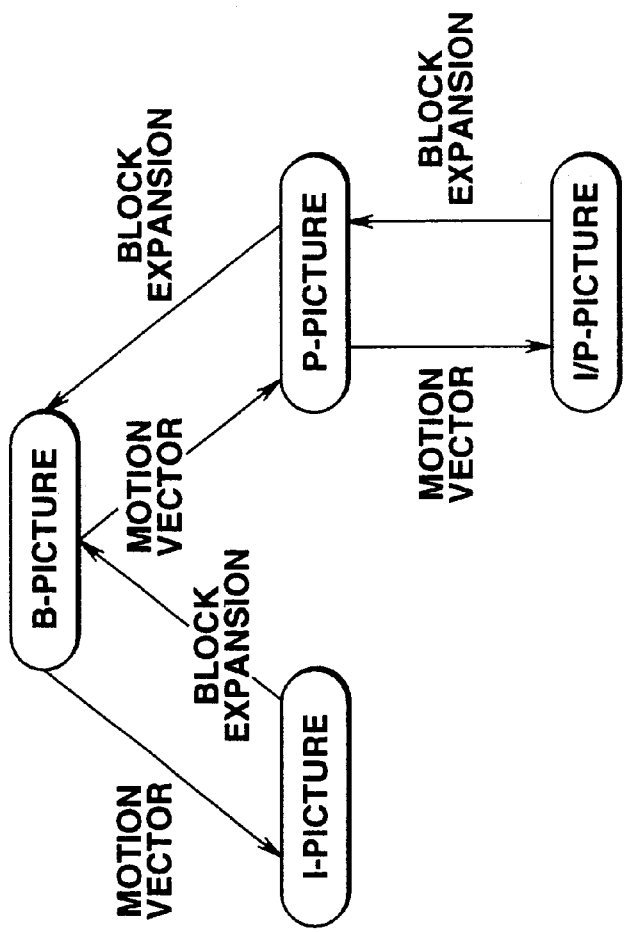
FIG. 8B is an explanatory drawing of the dependency among data in the first embodiment.
Figure 8A:
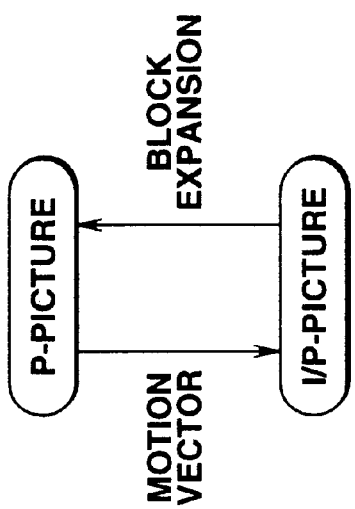
FIG. 8 consisting of FIG. 8A

FIG. 8 shows the dependency of data upon each other during motion compensation. FIG. 8A shows the dependency of P-picture. For decoding the P-picture, a block corresponding to a motion vector in a reference frame for an I-picture or P-picture is read and block-expanded. FIG. 8B shows the dependency of B-picture. When an I-picture is taken as a reference frame, similar operations to those in FIG. 8A are done. However, when a P-picture is taken as a reference frame, two steps of processing (two motion compensations in total) are required. Namely, since data of a block in a P-picture designated with the motion vector is not yet motion-compensated, it should be motion-compensated beforehand using a reference frame (I-picture or motion-compensated P-picture) for motion compensation of the P-picture. Thus, data of the P-picture previously restored is used for motion compensation of the B-picture.

Figure 9:
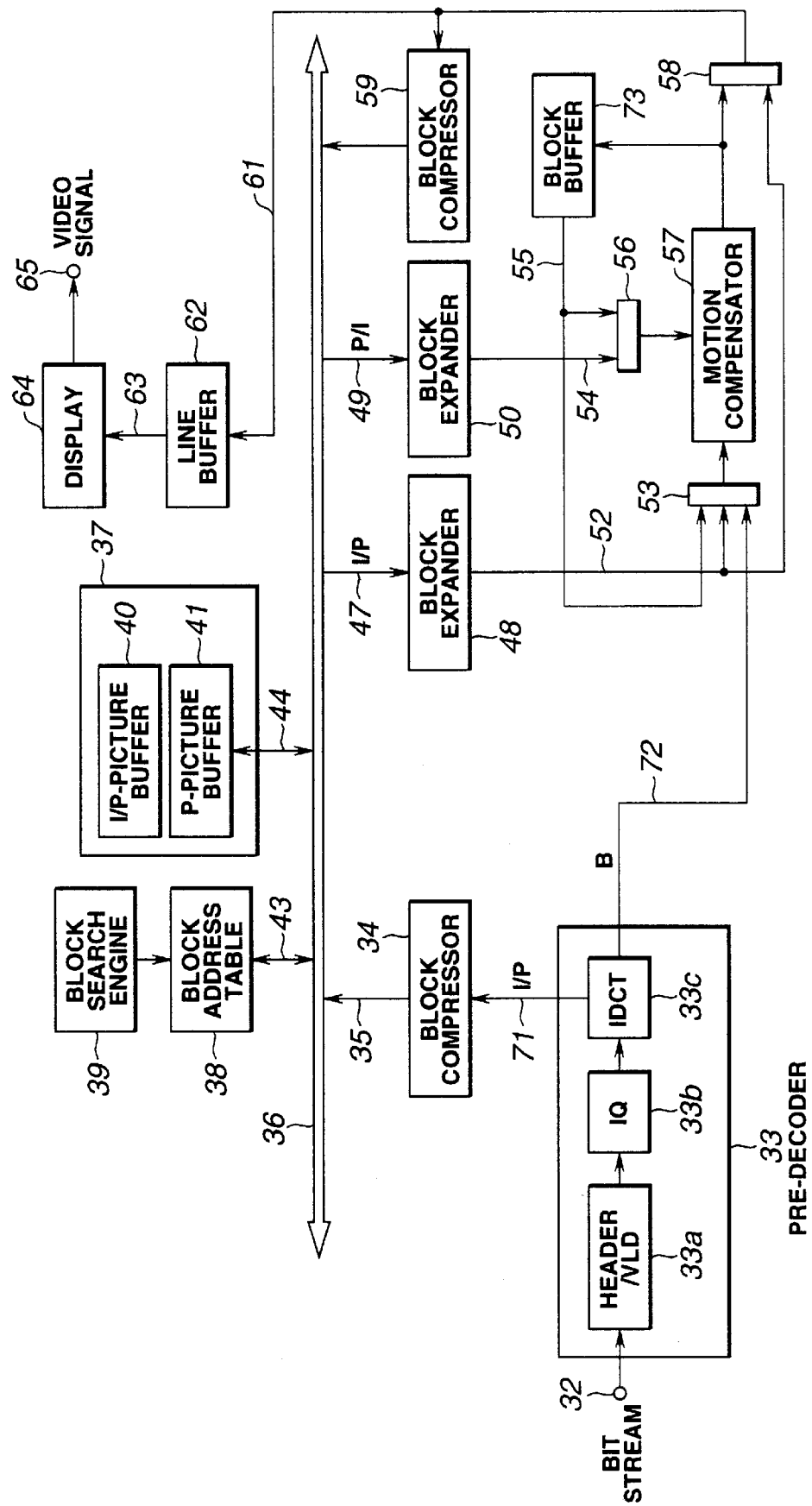
FIG. 9 is a block circuit diagram of a second embodiment of the decoding apparatus according to the present invention.

FIG. 9 schematically illustrates the configuration of the second embodiment of the present invention. The components in this second embodiment, indicated in FIG. 9 with same references as those in FIG. 6 have basically same functions as those of the same components in FIG. 6. In the second embodiment, B-picture is processed at the time of presentation without compressing the B-picture and holding the B-picture in the memory 37 (B-picture is motion-compensated and presented, not block-compressed).

As shown in FIG. 9, a pre-decoder 33 provides two outputs. Data of I-picture and P-picture from a signal line 71 are compressed by a block compressor 34 as in the first embodiment, and written into a memory 37 while an address table of the block is generated. On the other hand, data of B-picture from a signal line 72 is passed, not compressed, to a motion compensator 57.

Thus, the flow of decoding operations for I-picture and P-picture in the second embodiment is similar to that in the first embodiment in FIG. 6 except that B-picture is directly motion-compensated and presented, not compressed and stored in the memory 37. That is to say, data having passed from the pre-decoder 33 through the signal line 72 is passed to the motion compensator 57 in which it is processed with reference frame before and after it as in the first embodiment in FIG. 6. In the second embodiment, however, since the minimum unit of the data from the pre-decoder 33 is a macroblock, motion compensation, buffering, etc. are done on the unit of macroblocks. Also in the second embodiment, a block buffer 73 being an intermediate buffer for B-picture has a size corresponding to a macroblock, and the presentation line buffer 62 has also a corresponding size to a macroblock. Further, the memory 37 in the second embodiment has no area for the B-picture since no B-picture compression and write into the memory 37 are done. However, this is relevant to the progressive system. For the interlaced presentation and processing, picture data of a second field should be held for one-field period for presentation. Data compressed by the block compressor 59 and stored in the memory 37 is read from the memory 37 after the lapse of one-field period, block-expanded, and presented. Further, the display circuit 64 is adapted to have a memory area for one field to delay the data.

Figure 10:
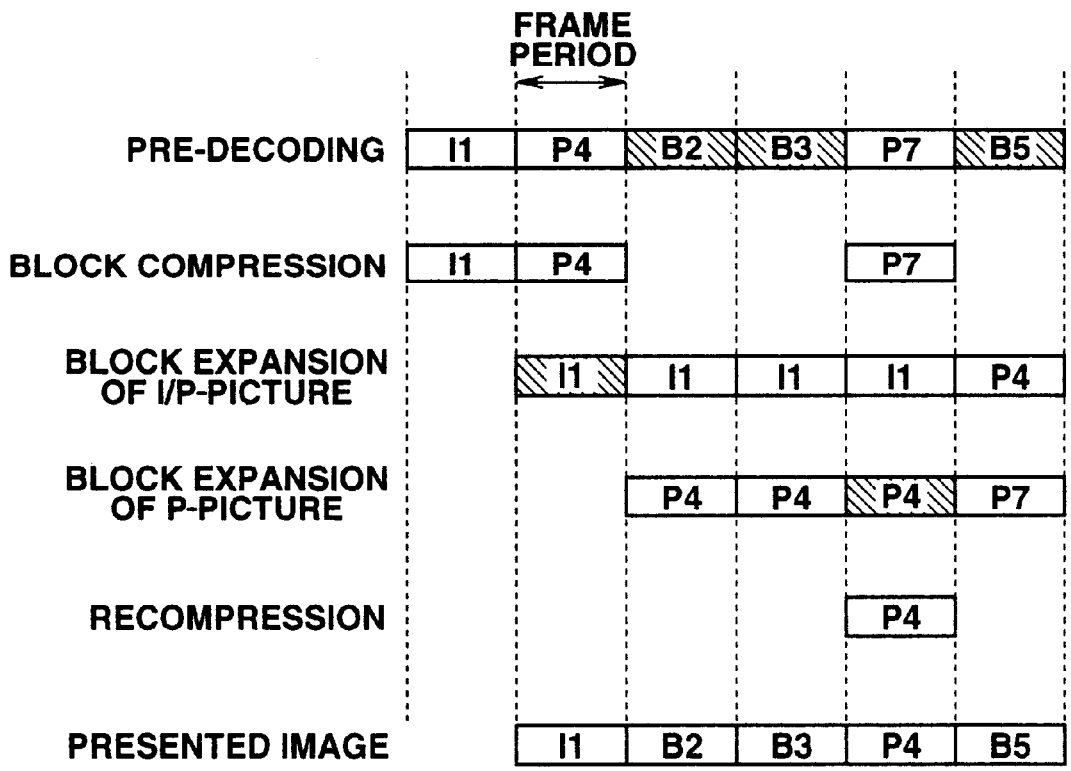
FIG. 10 shows the timed operations of the second embodiment.

FIG. 10 shows the times of processing and presentation in the second embodiment correspondingly to those in FIG. 7. In this second embodiment, I-picture are pre-decoded and block-compressed one frame before the presentation, and B-picture is simultaneously pre-decoded and motion-compensated at the time of presentation.

Figure 11:
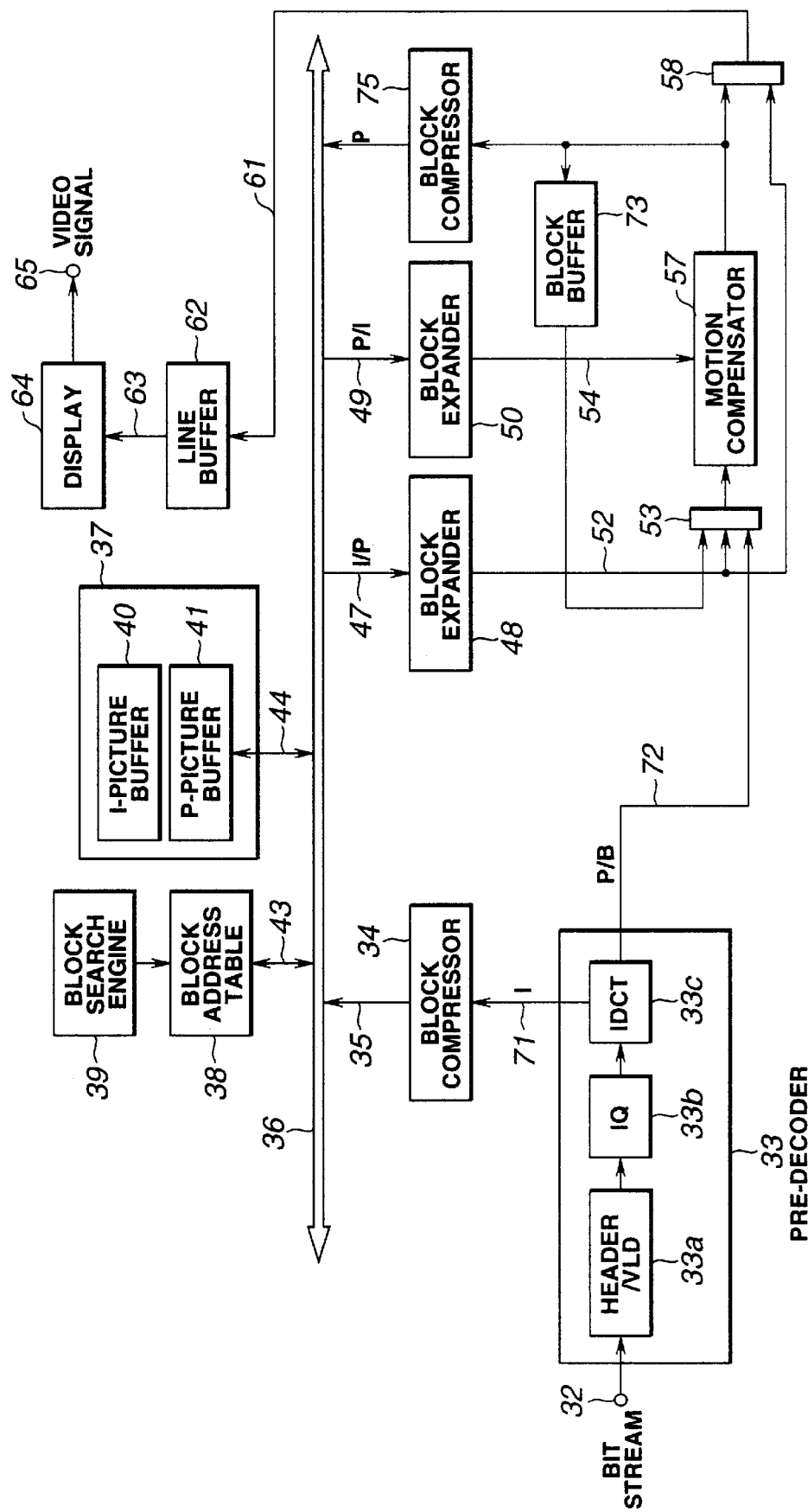
FIG. 11 is a block circuit diagram of a third embodiment of the decoding apparatus according to the present invention, showing the general configuration thereof.

FIG. 11 shows the general configuration of the third embodiment of the present invention. The decoding apparatus according to this embodiment is adapted to motion-compensate and display B-picture without block-compression thereof, motion-compensate P-picture after pre-decoding of the P-picture and then block-compress it, and store the data of the P-picture into the memory 37. For using the P-picture as a reference frame, the second step (second motion compensation) in which the reference frame for the P-picture is read again, the P-picture is motion-compensated and then used as a reference frame as shown in FIG. 8B, is not required. The block-expanded data of the P-picture is usable directly for motion compensation.

In the third embodiment shown in FIG. 11, the components indicated with the same references as those in FIG. 9 have basically same functions as those of the same components in FIG. 9 except that data passed from the pre-decoder 33 through the signal line 72 to the motion compensator 57 includes data of P-picture in addition to data of B-picture. On the other hand, data passed through the signal line 71 to the block compressor 34 includes only data of I-picture. The data of I-picture is compressed by the block compressor 34 and stored into the memory 37.

The third embodiment of the present invention includes no block buffer for two steps of motion compensation (two motion compensations in total) of P-picture since it is not necessary. Instead, a block compressor 75 is additionally provided for block compression of output from the motion compensator 57. As in the second embodiment, B-picture is processed at the time of presentation.

More particularly, in the third embodiment, data of P-picture is pre-decoded by the pre-decoder 33 and then passed to the motion compensator 57. Compressed data of I-picture (or motion-compressed P-picture) read from the memory 37 using the motion vector of the P-picture is passed through the signal line 49 to the block expander 50 in which it is expanded and a necessary data is selected from the I-picture data, motion-compensated with respect to the data of P-picture in the motion compensator 57, and then compressed by the block compressor 75 and written into the memory 37. Thus, the data expanded by the block expander 48 is passed through the selector 58 and signal line 61 to the line buffer 62, and presented by the display circuit 64.

In the third embodiment, B-picture is processed as in the second embodiment. Namely, intermediate result after forward or backward prediction is stored into the block buffer 73, and motion-compensated again, and then passed to the line buffer 62 for presentation.

Figure 12:
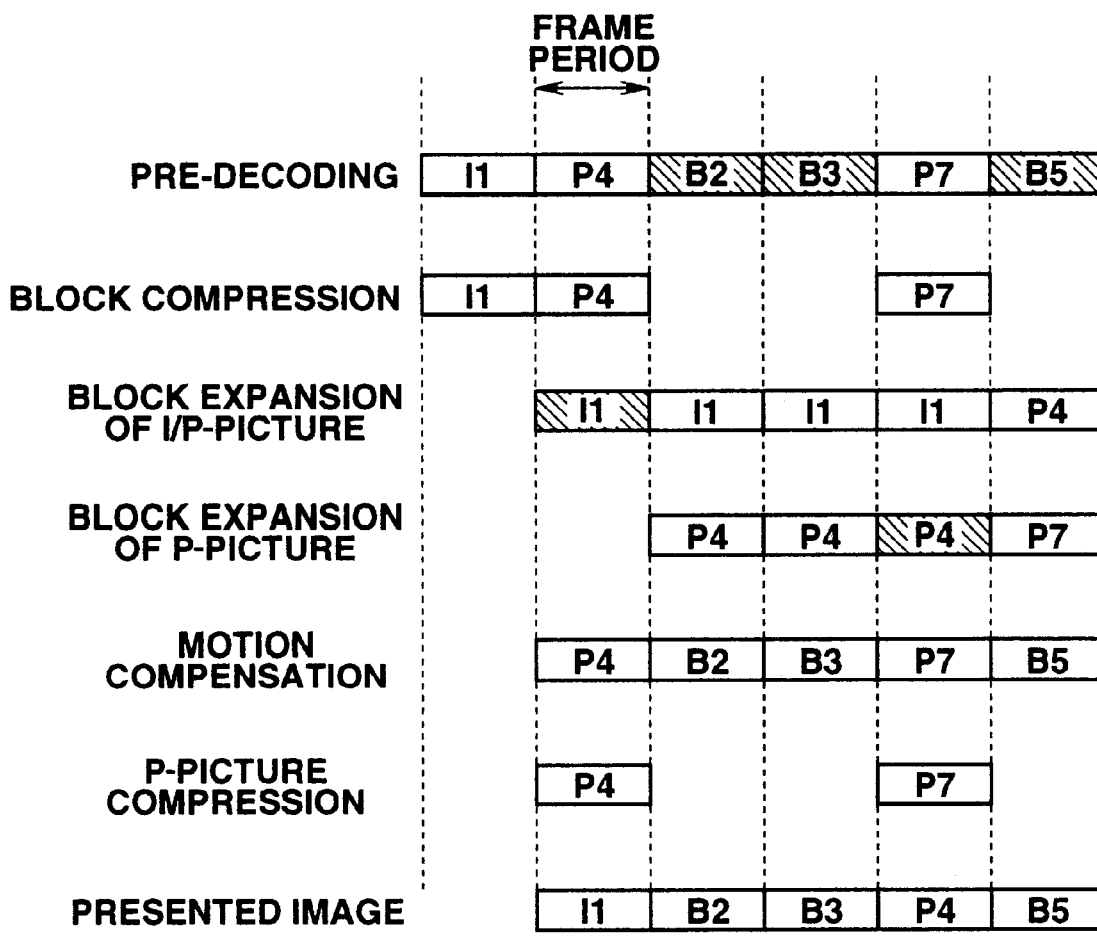
FIG. 12 shows the timed operations of the third embodiment.

FIG. 12 shows the times of processing and presentation in the third embodiment correspondingly to those in FIG. 10. In the third embodiment, since P-picture has been motion-compensated before block-compressed, it may not be motion-compensated at the time of presenting the P-picture at which P-picture will be motion-compensated.

As having been described in the foregoing, the present invention enables to considerably reduce the size of a frame buffer memory which would have to be large for the decoder in the conventional image compressing system using the interframe prediction. As having been described concerning the embodiments, the present invention can be carried out in various manners any of which can be selected depending upon a required level for an intended decoding system, thus permitting to select an appropriate system configuration. Also, the effect of compression according to the other algorithm leads to the memory size reduction as well as to the execution of data compression and expansion between the memory and bus with an effect that the band width on the bus can be much reduced. Therefore, no high-speed bus is required.

As seen from the foregoing description, the decoding apparatus according to the present invention decodes a compressed moving picture signal to block level, compresses the decoded data block by block, holds the address information of each block of the compressed data for storage into the memory, reads the compressed data from the memory for block-by-block expansion, reads for expansion a necessary compressed data from the memory at the times of actual presentation and motion compensation, and uses the expanded data for the actual presentation and motion compression. Thus, the increase of necessary memory capacity can be avoided, increase of chip area for integration of the memory and increase of manufacturing costs can be restrained, and bus band width can be reduced.

What is claimed is:

1. An apparatus for decoding a moving picture signal compressed through intraframe prediction, comprising:

means for pre-decoding the moving picture signal to block level, each block having a plurality of pixels;

means for block-compressing the pre-decoded data block by block, each block being compressed independently of any other block;

means for holding, block by block, address information of the data compressed by the block-compressing means and written into a memory; and means for reading the compressed data from the memory and expanding it block by block;

the compressed data necessary for presentation and motion compensation at the times of actual presentation and motion compensation being read from the memory on a block by block basis in accordance with said address information of one or more required blocks, expanded and used for the actual presentation and motion compensation.

2. The apparatus as set forth in claim 1, wherein the pre-decoding means includes an inverse quantizer (IQ) and an inverse discrete cosine transformer (IDCT).

3. The apparatus as set forth in claim 1, wherein the block-compressing means compresses data by variable-length coding.

4. The apparatus as set forth in claim 1, further comprising:

means for holding, block by block, data of which the frame is motion-compensated using a prediction frame as a reference frame; and means for motion-compensating the data taking as a reference the block held in the block holding means.

5. The apparatus as set forth in claim 1, wherein the bidirectionally predictive-coded frame is motion-compensated, not expanded block by block, and motion-compensated with the reference frame expanded block by block at the time of actual presentation, for use in presentation.

6. The apparatus as set forth in claim 1, wherein the forward predictive-coded frame is motion-compensated, then compressed block by block, and written into the memory.

* * * * *